United States Patent

[11] 3,627,108

[72] Inventor  Kenneth P. Hansen
              62 Belmont Ave., Plainview, N.Y. 11803
[21] Appl. No. 882,090
[22] Filed     Dec. 4, 1969
[45] Patented  Dec. 14, 1971

[54] ANGULAR CONVEYOR
     7 Claims, 4 Drawing Figs.
[52] U.S. Cl. ..................................... 198/102,
                                           198/80, 198/190
[51] Int. Cl. .......................................... B65g 37/00
[50] Field of Search .............................. 198/102,
                                            78, 79, 80, 81, 190

[56]            References Cited
            UNITED STATES PATENTS
1,324,017  12/1919  Mott .......................... 198/190 X
1,445,797   2/1923  Pierce ........................ 198/190 X
1,781,750  11/1930  Dodge et al ................. 198/190 X
3,037,548   6/1962  Hasselquist .................. 198/190 X Primary Examiner—Evon C. Blunk
Assistant Examiner—H. S. Lane
Attorneys—Curt M. Avery, Arthur E. Wilfond, Herbert L. Lerner and Daniel J. Tick ABSTRACT: An angular conveyor comprises a bed structure of substantially trapezoidal shape with one side at right angles to the two parallel sides, the fourth side extending relative to the third side at an angle which corresponds to the desired angular change in conveying travel. An axially elongated multiple driving pulley is rotatable along the third side, and individual belt pulleys are rotatable along the fourth side independently of each other. Endless conveyor belts of respectively different lengths are trained about the driving-pulley member and one of the respective individual pulleys. Each belt has a flattop portion in lateral proximity to the adjacent belt so that the belts conjointly form a substantially continuous top surface. The cross section of the belt is T-shaped with the lower portion forming a V-shape for engagement with V-grooves in the pulleys. A single such angle conveyor is sufficient for passing goods from a fixed counter top around any desired angle to another longitudinally undivided carryoff conveyor.

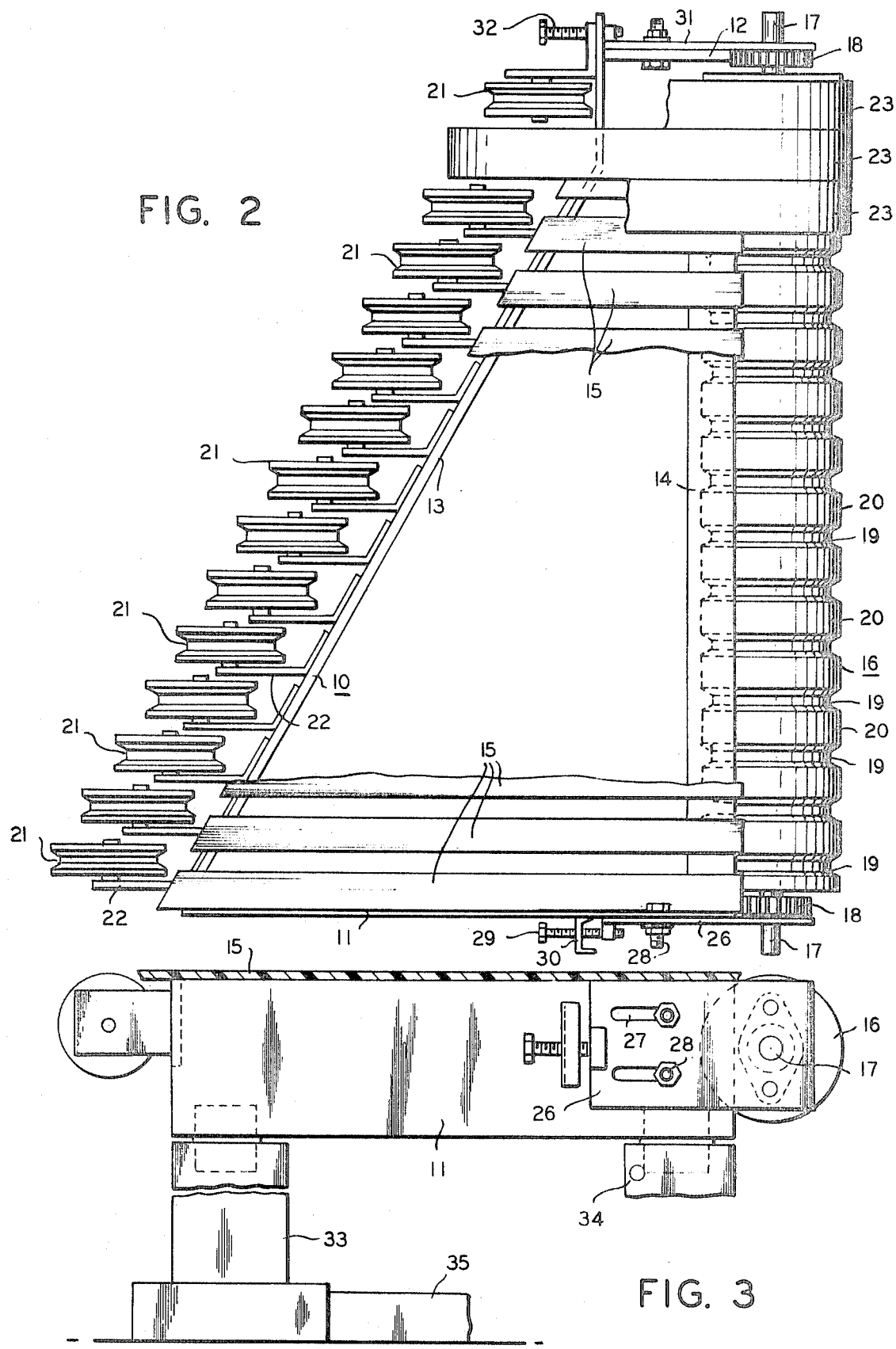

ANGULAR CONVEYOR

SPECIFICATION

My invention relates to conveyors for oblique delivery and has for its main object the provision of conveying equipment which is particularly well suitable for the handling of luggage or packages in airports, railroad stations, bus stations, post offices, or the like, and which affords delivery from the conveyor entrance at any desired angle to the takeoff facility with reliable yet simpler means than heretofore available for such purposes.

It is known to secure an angular delivery of material with an array of conjointly driven endless belts located side by side and of different, staggered lengths. One of these known devices, designed as a component of agricultural machinery for handling corps, does not afford a contiguous top surface and is not suitable for luggage handling and similar purposes. There is also a known conveyor operating with parallel belts of respectively different lengths for feeding sheet material into a cutter so arranged as to cut the material on the bias (U.S. Pat. No. 3,037,548), but no angular or oblique delivery of the material is involved and the conveyor itself does not offer a sufficient or contiguous support for such goods as are to be handled in airports or for similar purposes.

Another known conveyor, operating on the principle of parallel conveyor belts having respectively different lengths, is suitable for delivery at a right angle only and requires the provision of two multiple-belt assemblies, the belts of each assembly being adjacent to, and in staggered relation to the respective belts of the second assembly. Aside from the fact that such a double assembly is not suitable for angles other than 90°, the duplication of the belts and of the appertaining driving equipment renders such devices undesirably cumbersome.

It is therefore a more specific object of my invention to devise an angular conveyor of the multiple-belt type that avoids the shortcomings of the above-metnioned known devices.

More particularly, it is an object to provide a conveyor which permits changing the travel path of the transported goods by any desired angle within wide limits while requiring for this purpose but a single multiple-belt assembly with a single drive.

Another object of my invention is to provide an angular conveyor which readily permits being used in conjunction with a straight conveyor, together with one or more additional angular conveyors feeding onto the same straight conveyor, thus permitting a compact layout of the entire conveyor installation, while also affording the use of different delivery angles at the angular conveyors cooperating with the single straight conveyor.

Still another object of my invention is to secure in a multiple-belt angular conveyor a more positive and more reliable drive for each of the parallel belts of respectively different lengths without thereby impairing the most deisrable planar shape and close proximity of the belt top faces conjointly travelling in the delivering direction along the top run of the conveyor.

According to my invention, I provide an angular conveyor with a bed structure having substantially trapezoidal shape with two substantially parallel sides, a third side being at right angles to the parallel sides and a fourth side extending relative to the third side at an angle chosen in accordance with the specific needs which the angular conveyor is to serve. An axially elongated multiple-pulley member is rotatably mounted on the bed structure along the third side and serves as the belt-driving member of the angular conveyor. A number of belt pulleys are individually journaled along the fourth side of the bed structure. Endless conveyor belts of respectively different lengths are trained about the driving-pulley member and one of the individual pulleys respectively. Each belt has a flat upper portion in lateral proximity to the adjacent belt so that the belts conjointly form a flat and substantially continuous top surface.

According to one of the specific features of my invention, the conveyor is provided with two flattop members for passing conveyed objects onto and off the top surface formed by the arrays of belts. These flattop members have respective longitudinally undivided top faces which are substantially contiguous to the top surface of the belts at the second and third side respectively of the bed structure. The flattop members may both be constituted by fixed counter tops, or at least one of them may be constituted by a straight conveyor of any suitable type such as a single broad conveyor belt, as contrasted to an arrangement of a multiplicity of narrow parallel belts.

According to another feature of my invention, applicable with or without the above-mentioned flattop members, each of the endless belts extending between the common driving pulley and the respective individual pullesy has a generally T-shaped cross section, the flat upper portion being substantially in immediate lateral proximity to that of the adjacent belt to form the above-mentioned substantially continuous top surface. The lower portion of each T-shape constitutes a V-belt and the indivudual pulleys as well as the common driving have corresponding V-grooves engaged by the V-portions of the T-shaped belts to secure a more positive engagement than can be obtained with flat belts alone.

According to a further feature of my invention, more specific than those last mentioned, I provide the common driving-pulley member with cylindrical land surfaces, all of the same axial width and each located between two successive V-grooves for engagement by the flat upper portion of the T-shape belts; and I further provide the bed structure with a plurality of flat strip-shaped glide faces of which each straddles the adjacent flattop portions of two belts. Each two of these strip faces form between each other a recess or gap longitudinally of the belts and so situated that the lower, V-shaped portion of each T-shaped belt can freely pass lengthwise through the recess. In this manner, a good gliding support is afforded to each individual belt on both sides laterally of its V-portion as the upper run of the belt travels from the driving-pulley member to the individual pulley.

Preferably, and in accordance with further features of my invention, the bed structure of the angular conveyor is composed of a substantially trapezoidal frame and of a number of oblong strips which are fastened to the third and fourth sides respectively of the trapezoidal frame to form the above-mentioned parallel glide faces for supporting the travelling belts, the strips being spaced from each other a distance corresponding to the above-mentioned longitudinal recess so that the V-shaped lower portions of each T-belt, on its upper run, will pass through the gap between two adjacent strips.

The invention will be further described with reference to an embodiment of an angular conveyor according to the invention illustrated by way of example on the accompanying drawings, in which:

FIG. 2 is a top view of one of the angular conveyors that form part of the same installation, only three of the parallel belts being shown and other parts of the equipment being broken away.

FIG. 3 is a side elevation of the conveyor shown in FIG. 2; and

Figure 1:
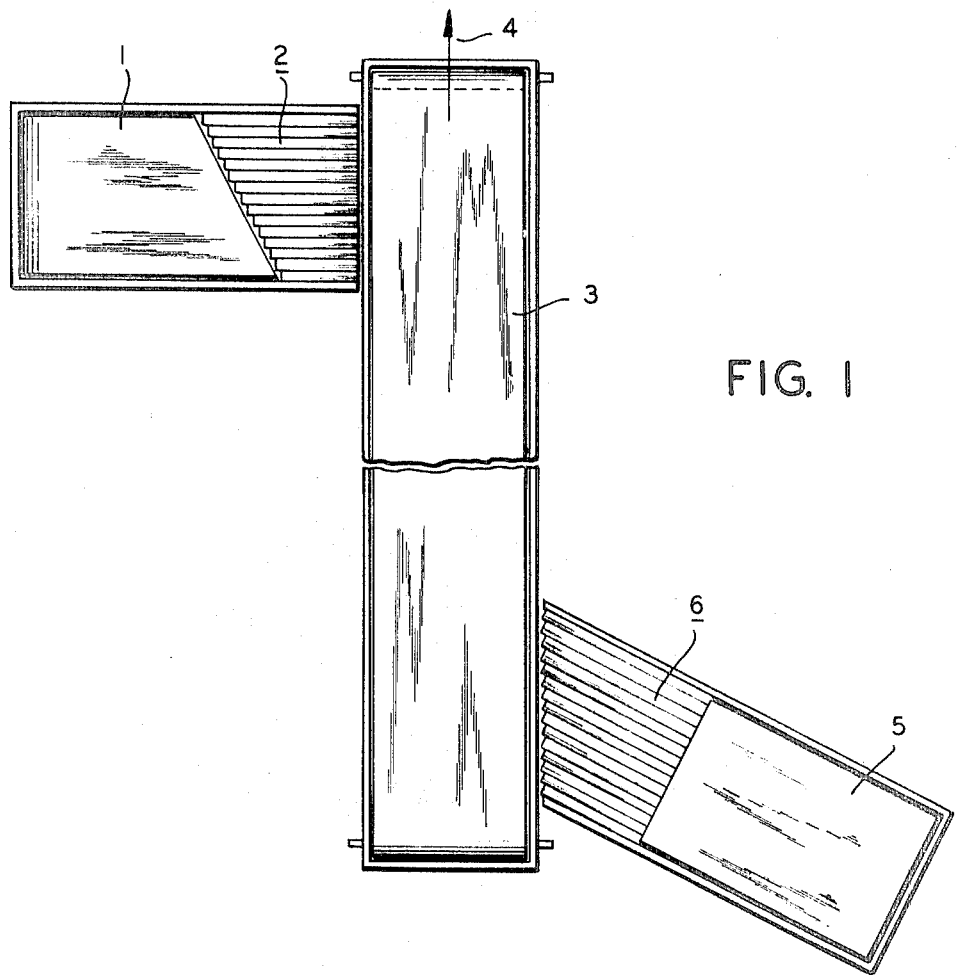
FIG. 1 is a schematic plan view showing one of the applicable layout arrangements of a conveyor installation.

Referring to FIG. 1, there is shown a conveyor installation suitable for receiving luggage from departing passengers in airports. The installation comprises a check-in counter 1 with a fixed counter top, for example of stainless steel. An angular conveyor denoted as a whole by 2 feeds the luggage from the check-in counter onto a conveyor 3 of the straight type. In the illustrated example, the conveyor 3 comprises an endless conveyor belt which forwards the luggage from the angular conveyor 2 in the direction shown by an arrow 4 to a chute or other delivering means or directly to the delivery end of the installation. Also shown in FIG. 1 is a second check-in counter top 5 from which the luggage received by another attendant is pushed onto an angular conveyor 6 which passes the luggage onto the same straight conveyor 3.

It will be understood that for some purposes a single angular conveyor such as shown at 2 or 6 will suffice, whereas other purposes may require more than two angular conveyors in conjunction with a collecting conveyor interconnecting the angular conveyors.

The angular conveyor 2 or 6 (in FIG. 1) comprises a bed structure which in the embodiment according to FIGS. 2 and 3 is formed by a metal frame of trapezoidal shape. The frame sides are constituted by structural steel members 11, 12, 13 and 14. The steel members 11 and 12 from the two parallel sides of the trapezoidal shape. The member 13 forms the third side which extends at a right angle to the members 11 and 12. The fourth member 14 extends at an acute angle to the member 11, this angle being chosen to suit the particular requirements and may amount from 30° or less to 45° or more.

Fifteen flat strips 15 are fastened in mutually parallel and spaced relation across the frame members 13 and 14 to conjointly form a grid-shaped support for the individual conveyor belts of the angular conveyor. A multiple driving pulley 16 extends along the frame member 14 and is firmly mounted on a drive shaft 17 journaled in bearings 18. The multiple pulley member 16 has V-grooves 19 equally spaced from each other by straight cylindrical surface portions 20 whose axial width corresponds substantially to the width of the strips 15 and with which the respective strips are aligned. The pulley member 16 may be composed of a number of individual pulley and discs placed axially beside each other, or it may consist of a single structure mounted on the shaft 17.

Fifteen individual V-belt pulleys 21 are mounted on bearing brackets 22 fastened to the frame member 13. Due to the trapezoidal shape of the frame, the individual pulleys 21 are staggered relative to each other so that the individual belts 23, each being trained about the common driving pulley 16 and one of the respective individual pulleys 21, have progressively increasing lengths counted from the belt 23 shown at the top of FIG. 2.

Figure 4:
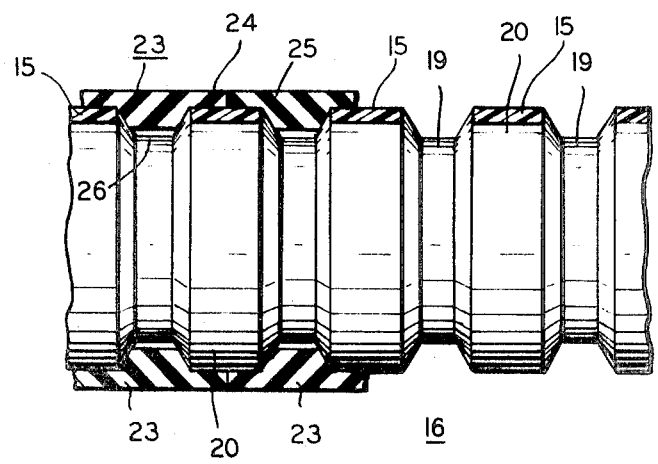
FIG. 4 shows a portion of the driving-pulley member with several of the V-shape belts, on a larger scale than FIG. 2.

The cross section of each belt 23 has substantially the shape of a T. As is best apparent from FIG. 4, this cross section has a flat upper portion resting upon two of the cylindrical land portions 20 of the driving pulley member 16 and adjacent to the top portion of the next belt. That is, each of the cylindrical portions 20 of the driving-pulley member 16 overlaps the respective top portions 24 of two mutually adjacent belts. The lower portion of the belt cross section forms a V-belt which wedgingly enters into the V-groove of the driving pulley, thus ensuring a reliable and positive drive of all of the belts at the same speed, especially by virtue of the belt-tensioning devices still to be described. The V-portion of the belts 23 may be formed as an integral with the flattop portion 24, 25 or a separate V-belt may be joined together with a flat belt such as by cementing or vulcanizing in order to obtain the T-shape of the belts.

It will be recognized that each of the supporting strips 15 (FIGS. 1, 3) is also overlapped by the top portions 24 and 25 of two adjacent belts, whereas the V-portion of each belt can freely pass through the gap between the two supporting strips 15 adjacent to the belt. To secure good gliding qualities of the supporting faces as well as the necessary mechanical supporting strength, the strips 15 are preferably made of laminated plastic such as nylon.

The bearing 18 for the driving-pulley shaft 17 (FIGS. 2, 3) is mounted on the frame member 11 by means of a supporting plate 26 which has two elongated openings 27 glidably seated on respective pins 28. A screw 29 in threaded engagement with an angle 30 secured to the frame member 11 permits forcing the bearing plate 26 to the upper belt-tensioning position to thus prevent undue slackening of the individual belts. A corresponding tensioning device is mounted on the frame member 12 and comprises a second bearing plate 31 cooperating with a tensioning screw 32. It will be understood that, if desired, other tensioning devices, such as a spring-biased, displaceable tensioning pulley may be mounted for each belt beneath the frame structure. However, a simple tensioning device of the type exemplified on the drawing and described above has been found sufficient and satisfactory.

The frame of the bed structure is mounted on standards 33 and 34 whose respective foot portions are interconnected by a bracket at 35 available for supporting an electric drive motor or other equipment for driving and controlling the angular conveyor.

While I have described a preferred embodiment in which the bed structure comprises individual supporting strips spaced from each other to permit the passage of the V-portions of each conveyor belt, it will be understood that the strips may be substituted by a single, for example, molded, supporting structure in which the gaps are formed by corresponding grooves.

Upon a study of this disclosure, it will be obvious to those skilled in the art that such and various other modifications are applicable without departing from the essential features of my invention and within the scope of the claims annexed hereto.

I claim:

1. An angular conveyor comprising a bed structure having a substantially trapezoidal shape with tow substantially parallel sides, the third side being perpendicular to said parallel sides and the fourth side extending relative to said third side at an angle corresponding to the desired angular change in conveying travel; an axially elongated multiple V-belt pulley member rotatably mounted along said third side and means for driving said member, a mulitplicty of indiivudal V-belt pulleys individually rotatable along said fourth side; endless confyor belts of respcetively different lengths trained about said pulley member and one of said respective individual pullesy, each of said belst having generally T-shaped with a flat upper portion substantially in immediate lateral proximity to the adjacent belt so that said belts conjointly form a flat and substantially continuous top surface, the lower portion of each T-sahped belt having V-shaped and egaging said V-belt pulley member and said one individual V-belt pulley; said bed structure comprising a multiplicity of fixed supporting strips of respectively different length extending between said second and third sides and having flat top faces for glidably supporting the top rung of said belts, each of said strips having a width overlapping the flat upper portions of two adjacent ones of said conveyor belts, each two adjacent ones of said strip being spaced from each other to form therebetween a gap traversed by said V-shaped lower portion one of said respective conveyor belts.

2. In an angular conveyor according to claim 1, said multiple pulley member comprising annular V-grooves engaged by said V-shaped lower portions of said respective conveyor belts, and having a cylindrical surface portion axially between each two V-grooves, said cylindrical surface portions being aligned with said respective strips.

3. In a conveyor according to claim 1, said multiple-belt pulley having V-belt grooves which are all of the same diameter, said individual pulleys having the same diameters among themselves.

4. In a conveyor according to claim 3, said V-grooves of said pulley member being equally spaced from each other, said cylindrical surface portions of said pulley member having the same diameter and the same axial width, and said strips having substantially the same width as said individual cylindrical surface portions.

5. In a conveyor according to claim 1, said bed structure comprising a trapezoidal frame which forms said four sides, said strips being fixedly secured across said frame, and said pulley member and individual pulleys having respective bearings mounted on said frame.

6. An angular conveyor comprising a bed structure having substantially trapezoidal shape with two substantially parallel sides, the third side being at right angles to the parallel sides and the fsurth side extending relative to said third side at an angle corresponding to the desired angular change in conveying travel; an axially elongated multiple-belt pulley member rotatably mounted along said third side and means for driving said member, a member of individual belt pulleys individually rotatable along said furets165 side; endless conveyor belts of respectively different lengths trained about said pulley member and one of said respective individual pulleys, each of said belts having a flat upper portion in lateral proximity to the adjacent belt so that said belts conjointly form a flat and substantially continuous top surface, two fault top members for passing conveyed objects onto and away from said top surface of said betls, said members having respective longitudinally undivided tabletop faces substantially contiguous to said top surface of said belts at said third and fourth sides respectively of said bed structure one of said flattop members being fixed to form object-reccm 7 a ba 7. A conveyor assembly comprising a plurality of angular conveyors according to claim 6, a straight conveyor having a top face substantially undivided longitudinally and adjacent to one of the two pulley sides of each of said angle conveyors to carry conveying objects away from said respective angular conveyors, said angular conveyors being spaced from each other longitudinally of said straight conveyor, and a plurality of receiving counter tops fixedly mounted adjacent to the other pulley side of said respective angular conveyors.

* * * * *